Feb. 3, 1925.
W. YOSCARY
AUTOMOBILE HEADLIGHT REFLECTING ATTACHMENT
Filed April 11, 1923
1,525,114
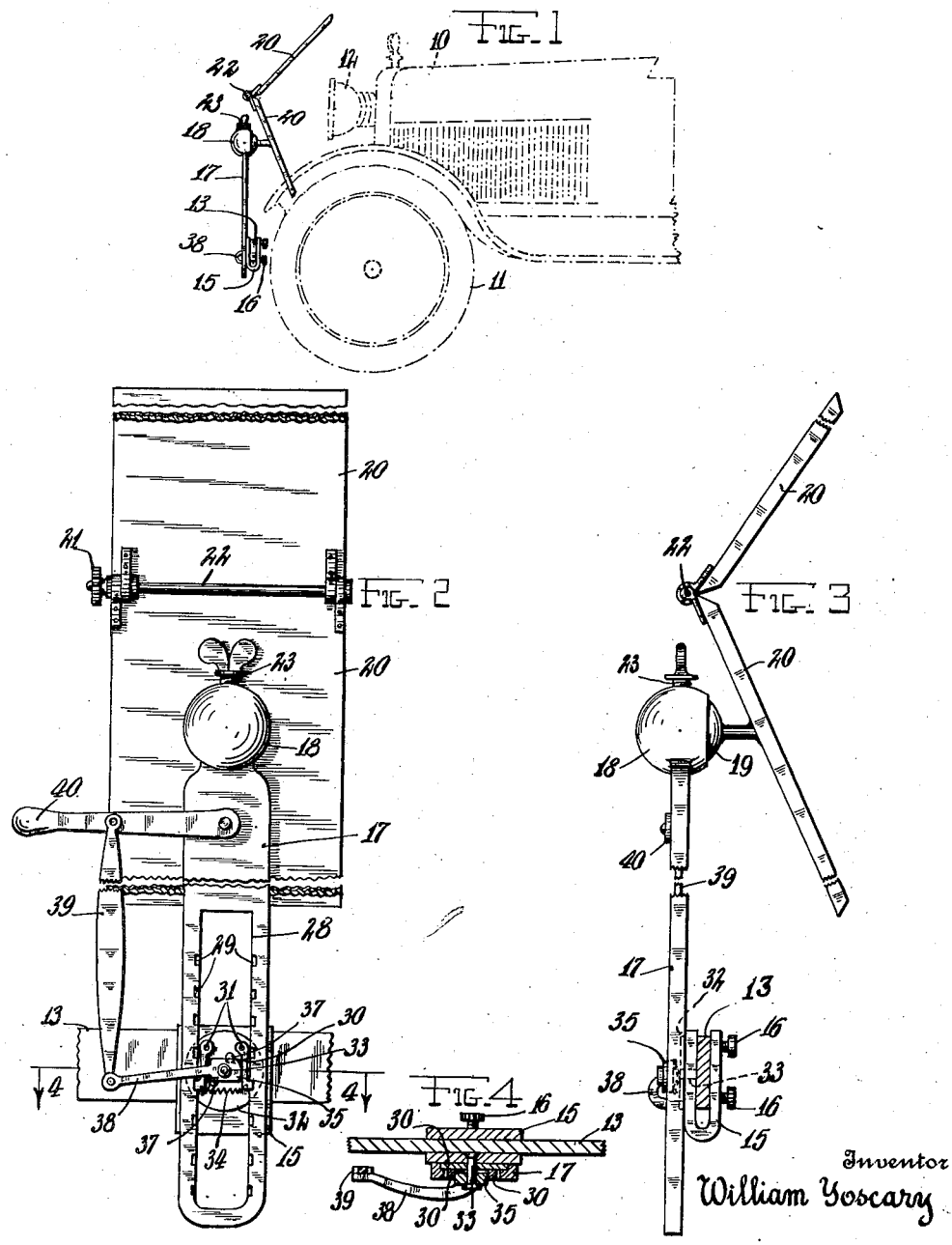
Inventor
William Yoscary Patented Feb. 3, 1925.

1,525,114

UNITED STATES PATENT OFFICE.

WILLIAM YOSCARY, OF NEW YORK, N. Y.

AUTOMOBILE HEADLIGHT-REFLECTING ATTACHMENT.

Application filed April 11, 1923. Serial No. 631,316.

*To all whom it may concern:*

Be it known that I, WILLIAM YOSCARY, a citizen of the United States, residing at New York, in the county of New York, and State of New York, have invented certain new and useful Improvements in Automobile Headlight - Reflecting Attachments, of which the following is a specification.

This invention relates to a reflecting attachment for automobile headlights adapted to be used in case it is desired to reflect the light from the headlight backward into the engine hood or upon any other part of the automobile.

The invention has for a general object to provide a reflecting device of this type, other specific objects relating to the ready mounting and removal of the same, and to the ready adjustability of the reflector to direct the reflected beams of light upon the desired part.

For further comprehension of the invention, and of the objects and advantages thereof, reference will be had to the following description and accompanying drawing, and to the appended claims in which the various novel features of the invention are more particularly set forth.

Fig. 1 of the drawing is a fragmentary side view of an automobile showing my improved reflector mounted thereon.

Fig. 2 is a front view of the reflector.

Fig. 3 is a side view thereof.

Fig. 4 is a horizontal section on the line 4—4 of Fig. 2.

In the drawing the reference numeral 10 indicates the engine hood of an automobile, 11 one of the front wheels, 12 one of the usual headlights, and 13 the fender bar with which automobiles are customarily provided, my improved reflector being here shown as arranged for mounting on this fender bar 13.. To this end I provide a U-shaped bracket 15 which straddles this bar and may be removably secured thereto by the set screws 16. Mounted on this bracket for vertical and angular adjustment, is a post 17 in the form of a flat bar which supports the reflecting mirror. As here shown the upper end of the post is formed with a spherical socket 18 in which is a ball 19 to which the reflector is attached. As here shown I provide a pair of reflectors 20 one of which is fixed to the ball 19, and the other is hinged to the first one, a nut 21 being threaded on the hinge pintle 22 whereby the reflectors may be locked to one another in such relative angular adjustment as may be desired. A set screw 23 is threaded into the socket 18 and holds the ball 19 rigid therein.

Referring now to the means whereby the post 17 is mounted on the bracket 15. The post is formed with a longitudinally extending slot 28 in the opposite walls of which are spaced notches 29 adapted to be engaged by latches 30 pivoted as at 31 upon a disk 32 rotatably mounted on a stud 33 fixed to the bracket 15, this disk being sunk into a suitable recess in the rear face of the post 17. The latches 30 are normally urged out of the notches 29 by a tension spring 34 connected at opposite ends to the respective latches, and are adapted to be held in engagement with said notches by a rotary cam 35 pivoted on the stud 33. This cam 35 is also adapted, upon rotary movement, to lock the disk 32 to the bracket 15 and to this end the disk is formed with a pair of projections 37 on its forward side with which the rear face of said cam is adapted to engage. Fixed to the cam is an arm 38 which is connected by a rigid link 39 with a hand lever 40 fulcrumed upon the upper end of the post.

In the use of my improved reflector the U-bracket 15 is clamped on the fender bar 13 by the screws 16 and the post 17 adjusted as desired, after which the lever 40 is moved to tighten the cam 35 against the latches 30 and the projections 37. As is clearly evident from Fig. 2 of the drawing rotary movement of the cam in a releasing direction will cause it to disengage from the projections 37, and so free the post for angular adjustment, before the latches 30 are freed from the notches 29 in the post, so that if it is desired at any time, when the device is in place, to vary the angular positioning of the post the lever 40 can be given just sufficient loosening movement for this purpose and then again moved in a tightening direction.

As will be apparent, my improved reflector will prove of considerable convenience for automobile drivers who may have trouble with the running or driving mechanism at night. While I have illustrated and described a preferred embodiment of my invention it is to be understood that I do not limit myself to the precise construction herein disclosed, and that various changes and modifications might be made therein without departing from the spirit and scope of the invention as defined in the appended claims.

Having thus described my invention, what I claim as new and desire to protect by Letters Patent of the United States is as follows:

1. A device of the class described comprising a bracket adapted for fixing on an automobile, a stud fixed on said bracket, a disk rotatable on said stud, a pair of latches pivoted on said disk, a reflector holding post having longitudinally spaced devices adapted to be engaged by said latches to support the post, and a cam rotatable on said stud and adapted to move said latches into engagement with the said devices.

2. A device of the class described comprising a bracket adapted for fixing on an automobile, a stud fixed on said bracket, a disk rotatable on said stud, a pair of latches pivoted on said disk, a reflector holding post having longitudinally spaced devices adapted to be engaged by said latches to support the post, and a cam rotatable on said stud and adapted to move said latches into engagement with the said devices, and a spring attached at opposite ends to the said latches for removing them from engagement with the said devices.

3. A device of the class described comprising a bracket adapted for fixing on an automobile, a stud fixed on said bracket, a disk rotatable on said stud, a pair of latches pivoted on said disk, a reflector holding post having longitudinally spaced devices adapted to be engaged by said latches to support the post, and a cam rotatable on said stud and adapted to move said latches into engagement with the said devices, and a spring attached at opposite ends to the said latches for removing them from engagement with the said devices, and projections on said disk adapted to be engaged by said cam to clamp the disk to the said bracket.

In testimony whereof I have affixed my signature.

WILLIAM YOSCARY.